Feb. 5, 1963        M. D. KULIK        3,076,657
FLUID SEAL
Filed Feb. 10, 1961
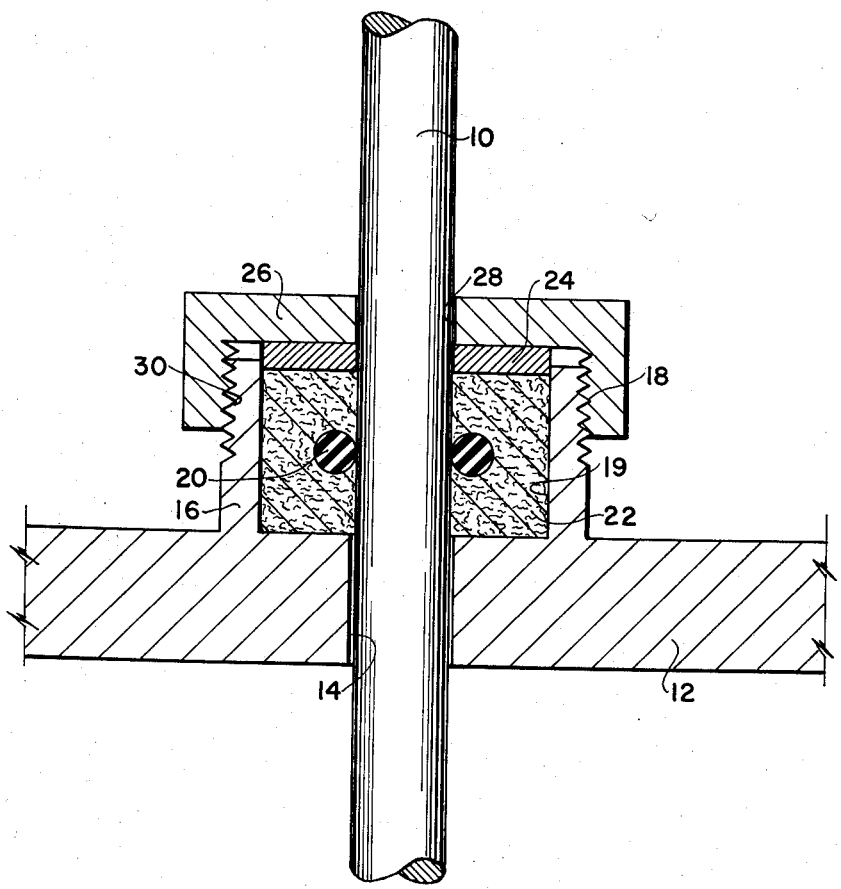
INVENTOR.
METRO D. KULIK
BY
HIS ATTORNEY

United States Patent Office 3,076,657
Patented Feb. 5, 1963

3,076,657
FLUID SEAL
Metro D. Kulik, Pittsburgh, Pa., assignor to Consolidation Coal Company, Pittsburgh, Pa., a corporation of Pennsylvania
Filed Feb. 10, 1961, Ser. No. 88,549
4 Claims. (Cl. 277—110)

This invention relates to a fluid seal and more particularly to a seal that prevents fluid, either gas or liquid, from leaking between relatively rotatable shaft and housing members.

In recent years, O-rings have been utilized for a great number of sealing purposes. The present invention provides a novel manner of utilizing an O-ring to seal a rotatable shaft.

Most O-ring seals that have hitherto been designed have utilized the O-rings as static seals where little or no motion occurred between the elements being sealed. Where considerable motion is present between the elements it is customary to make the seal with the inner wall of the O-ring in contact with the wall of the rotatable shaft and the outer wall of the O-ring in contact with the inner wall of the gland or housing member. The present invention provides a novel O-ring seal for dynamic sealing purposes. The O-ring is utilized to seal a rotary shaft relative to a fixed housing member by the O-ring contacting only the rotatable shaft and not directly contacting the fixed housing member.

In the present invention, the O-ring is placed in sealing relation with the shaft and the shaft and the O-ring are surrounded by a fibrous material which is saturated with lubricant to permit substantially frictionless rotation of the shaft and the ring within the fibrous material. The fibrous material, which may be formed of asbestos or other porous fiber saturated with graphite, silicone oil or petroleum oil lubricants or the like, serves to both lubricate and seal the O-ring and the shaft within the housing. Because of the lubricating qualities of the saturated fiber, the seal of the present invention is substantially frictionless and may be utilized even on light instruments in which very little shaft drag due to friction can be tolerated.

With the foregoing considerations in mind, it is a primary object of the present invention to provide an improved fluid seal.

Another object of this invention is to provide a low friction seal which is easily assembled from a minimum number of parts.

Another object of this invention is to provide a self lubricating seal which may be adjusted to increase the sealing force created thereby.

These and other objects achieved by this invention will become apparent as this description proceeds in conjunction with the accompanying drawing.

The single drawing accompanying this description is a sectional elevation view of the novel seal of the present invention.

Referring to the drawing, a rotatable shaft 10 passes through a wall 12 of a vessel containing gas or liquid through a bore 14 which is slightly larger than the diameter of the shaft 10. Formed on the outer surface of wall 12 is a cylindrical boss or packing gland 16 which is coaxial with the bore 14 through the wall 12. The boss 16 has external threads 18 formed on its free end.

Between the external surface of shaft 10 and the internal surface of the boss 16 is formed an annular chamber 19 which receives the seal components. Within the annular chamber 19, an O-ring 20 is placed over shaft 10 in sealing relation with shaft 10. The O-ring may be formed of any conventional compressible, resilient sealing material such as natural rubber or synthetic compounds such as silicon rubber, fluorocarbon rubber, or the like. The material of the O-ring is chosen to be most resistant to the degradation effect of the gas or liquid being sealed, and to be resistant to heat if the seal is employed at elevated temperatures. The O-ring is slightly deformed to fit over shaft 10 so that there is a complete seal between shaft 10 and O-ring 20.

The remaining portion of chamber 19 is filled with a plastic fibrous mass 22 which is preferably graphite or silicone oil impregnated fiber. The impregnated fiber is a lubricating material which serves to both lubricate the shaft 10 and O-ring 20 and to provide a sealing material between shaft 10 and the housing boss 16 and between the outer wall of the O-ring 20 and housing boss 16.

A thrust washer 24 is placed within the end of chamber 19 and a cap member 26 having a bore 28 and an internally threaded portion 30 is threaded onto the boss 16 with the shaft 10 projecting through the cap member bore 28. The cap member 26 abuts thrust washer 24 and forces it downwardly into the chamber 19 to thereby exert a compressive force upon the plastic fibrous mass 22 which also exerts a compressive force on the O-ring 20. The O-ring 20 then, due to its resiliency, tends to expand and exerts a reactive force on the fibrous mass 22 to maintain the fibrous mass in forceful contact with the O-ring and with the internal wall of boss 16. Cap member 26 may be tightened as necessary to complete a fluid seal between the shaft and housing 12. The cap member should not, however, be tightened so greatly that excessive frictional resistance is exerted upon the rotatable shaft 10 and O-ring 20.

In operation, the shaft 10 rotates while the housing wall 12 remains fixed. Fluid from within the housing 12 is prevented from passing out through bore 14 by the seal arrangement of the O-ring and the fibrous mass 22. Since the O-ring 20 contacts only the shaft 10 and not the wall 12, the O-ring 20 cannot stick to the two relatively rotatable members and thereby prevent free rotation of shaft 10 as often occurs when O-ring seals are utilized for dynamic seal components. Further, it has been found that the arrangement described herein provides surprisingly long life and effective sealing.

The seal of the present invention was utilized in laboratory operation to seal a shaft projecting from a vessel in which gas and liquid were maintained at between 50 and 200 p.s.i. The shaft 10 rotated at a speed of 1200 r.p.m. The seal of the present invention operated continuously for well over 500 hours without failure and without permitting any leakage to occur. Under these same conditions, conventional fluid seals had very poor life spans. A conventional fluid seal utilizing only a graphite packing, without an O-ring as described herein, had a useful life of only one hour. When rubber O-ring seals were utilized in which the O-ring contacted both the shaft and the wall 12, the seals had a useful life of only about 20 hours.

The seal of the present invention provides a relatively simple arrangement of operating elements. It is easily assembled from a minimum number of relatively inexpensive parts.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:
1. A fluid seal for preventing leakage of fluid between relatively rotatable shaft and housing members comprising an annular chamber formed in said housing member around said shaft, an O-ring positioned in sealing relation around said shaft within said chamber, said O-ring being spaced from the walls of said chamber, a lubricated fibrous mass substantially filling said chamber and surrounding said O-ring and said shaft, and means to compress said fibrous mass to thereby maintain said fibrous mass in abutting relation with said O-ring.

2. A fluid seal for preventing leakage of fluid between relatively rotatable shaft and housing members comprising an annular chamber formed in said housing member around said shaft, a resilient O-ring positioned in sealing relation around said shaft within said chamber, said O-ring being spaced from the walls of said chamber, a lubricated fibrous mass substantially filling said chamber and surrounding said O-ring and said shaft, and an annular closure means for said chamber adapted to apply a compressive force on said fibrous mass, said compressive force being transmitted to said O-ring to distort said O-ring so that said O-ring reacts to maintain a force upon said fibrous mass during operation of said seal.

3. A fluid seal for preventing leakage of fluid between a rotatable shaft and a fixed housing, said shaft extending through a wall of said housing, said seal comprising a cylindrical boss formed on said housing in coaxial relation to said shaft, said boss forming an annular chamber between said shaft and the internal surface of said boss, said boss being externally threaded adjacent its free end, a resilient O-ring positioned around said shaft in sealing relation to said shaft within said annular chamber, said O-ring being spaced from the walls of said chamber, a lubricated fibrous mass substantially filling said chamber and surrounding said O-ring and said shaft, an annular thrust washer positioned within said chamber over said fibrous mass, and an internally threaded cap threaded on said boss free end, said cap forcing said thrust washer into said chamber to exert a compressive force on said fibrous mass.

4. A fluid seal for preventing leakage of fluid between a rotatable shaft and a fixed housing, said shaft extending through a wall of said housing, said seal comprising a cylindrical boss formed on said housing in coaxial relation to said shaft, said boss forming an annular chamber between said shaft and the internal surface of said boss, said boss being externally threaded adjacent its free end, a resilient O-ring positioned around said shaft in sealing relation to said shaft within said annular chamber, said O-ring being spaced from the walls of said chamber, a graphite impregnated fibrous mass substantially filling said chamber and surrounding said O-ring and said shaft, said graphite impregnated mass providing a source of lubrication for lubricating said shaft and said annular chamber, an annular thrust washer positioned within said chamber over said mass, and an internally threaded cap having a bore therethrough threaded on said boss free end with said shaft extending through said cap bore, said cap forcing said thrust washer into said chamber to exert a compressive force on said fibrous mass.

References Cited in the file of this patent
UNITED STATES PATENTS

| | | |
|---|---|---|
| 1,953,033 | Widmer | Mar. 27, 1934 |
| 2,473,139 | Dickerman | June 14, 1949 |
| 2,570,117 | Hallstrand | Oct. 2, 1951 |
| 2,571,560 | Gall | Oct. 16, 1951 |
| 2,731,282 | McManus et al. | Jan. 17, 1956 |